(12) United States Patent
Hu et al.

(10) Patent No.: US 10,962,737 B2
(45) Date of Patent: Mar. 30, 2021

(54) LENS MODULE

(71) Applicant: TDK Taiwan Corp., Taipei (TW)

(72) Inventors: Chao-Chang Hu, Taoyuan County (TW); Shao-Kuang Huang, Taoyuan (TW); Chih-Wei Weng, Taoyuan (TW)

(73) Assignee: TDK Taiwan Corp.

( * ) Notice: Subject to any disclaimer, the term of this patent is extended or adjusted under 35 U.S.C. 154(b) by 267 days.

(21) Appl. No.: 16/116,783

(22) Filed: Aug. 29, 2018

(65) Prior Publication Data

US 2019/0072744 A1 Mar. 7, 2019

Related U.S. Application Data

(60) Provisional application No. 62/553,236, filed on Sep. 1, 2017.

(51) Int. Cl.
*G02B 7/09* (2021.01)
*G02B 7/02* (2021.01)
(Continued)

(52) U.S. Cl.
CPC .............. *G02B 7/09* (2013.01); *G02B 7/021* (2013.01); *G02B 7/08* (2013.01); *G02B 27/646* (2013.01)

(58) Field of Classification Search
CPC . G02B 7/09; G02B 7/021; G02B 7/08; G02B 27/646
(Continued)

(56) References Cited

U.S. PATENT DOCUMENTS

| 6,616,480 B2 | 9/2003 | Kameyama |
| 2014/0111877 A1 | 4/2014 | Uno et al. |
| 2015/0309282 A1* | 10/2015 | Lee .......................... G02B 7/09 359/814 |

FOREIGN PATENT DOCUMENTS

| CN | 1877378 A | 12/2006 |
| CN | 101932965 A | 12/2010 |

(Continued)

OTHER PUBLICATIONS

Office Action dated Aug. 3, 2020 for corresponding China Application No. 201810956419.2.
(Continued)

*Primary Examiner* — James R Greece
(74) *Attorney, Agent, or Firm* — Raymond Sun

(57) ABSTRACT

A lens module comprises a frame, a lens unit, and a driving module for driving the lens unit to move relative to the frame. The lens unit comprises a body made of plastic, at least one lens located in a center of the body, and an embedded member made of metal. The metal embedded member is embedded within a thinner rim portion of the lens unit by means of a plastic insert-molding process in such a manner that, at least one protrusion of the metal embedded member is exposed outside of the rim portion. When the lens unit moves relative to the frame, a location where the lens unit might touch the frame is one of the at least one protrusion, and therefore the structural strength, endure ability of impact and endure ability of friction at the rim portion of the lens unit are increased. In addition, the protrusion can also act as a positioning post or winding post for a coil of the driving module. Or, the coil can also be electrically connected to the protrusion such that the metal embedded member can transmit electric current for the coil.

9 Claims, 19 Drawing Sheets

(51) Int. Cl.
*G02B 7/08* (2021.01)
*G02B 27/64* (2006.01)

(58) Field of Classification Search
USPC .......................................... 359/819–820, 824
See application file for complete search history.

(56) References Cited

FOREIGN PATENT DOCUMENTS

| | | | |
|---|---|---|---|
| CN | 105005131 | A | 10/2015 |
| CN | 105306795 | A | 2/2016 |
| CN | 105911796 | A | 8/2016 |
| CN | 105988262 | A | 10/2016 |
| TW | 200807133 | A | 2/2008 |
| TW | 200941110 | A | 10/2009 |
| TW | 201126223 | A | 8/2011 |

OTHER PUBLICATIONS

Office Action dated Feb. 11, 2020 for corresponding Taiwan Application No. 107129137.

\* cited by examiner

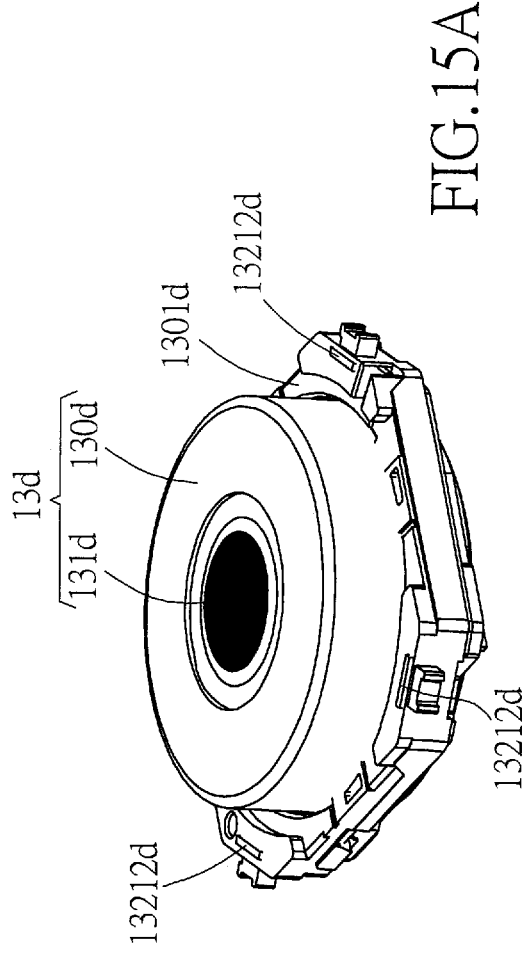
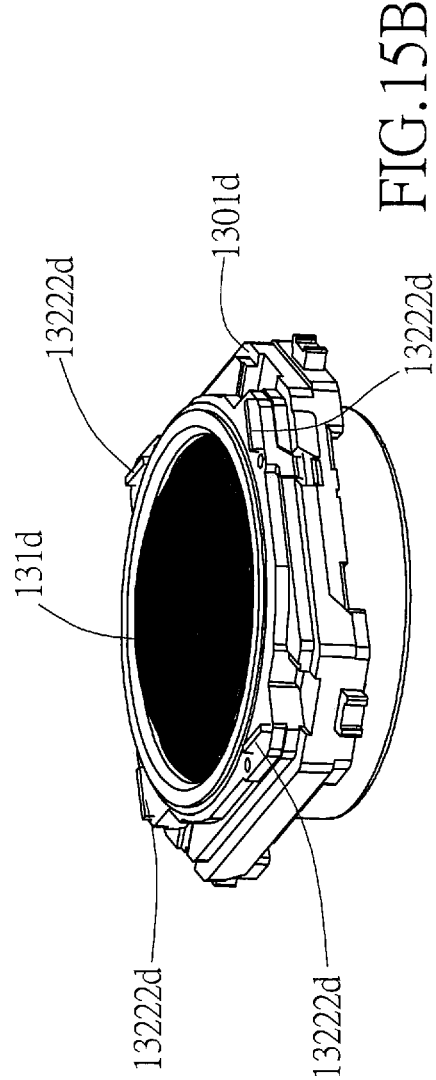
FIG.15A
FIG.15B

LENS MODULE

RELATED CASES

This application claims the benefit of U.S. provisional patent application Ser. No. 62/553,236, filed on Sep. 1, 2017, whose disclosures are incorporated by this reference as though fully set forth herein.

BACKGROUND OF INVENTION

1. Field of the Invention

The invention refers to a lens module, especially refers to a lens module that uses a plastic insert-molding process to embed a metal embedded member within a thinner rim portion of a lens unit so as to increase the structural strength and the endure abilities of impact and friction at the rim portion.

2. Description of the Prior Art

Miniaturization is a trend of novel designs for image capturing modules nowadays, especially for the image capturing modules furnished in portable electronic devices such like smart phones, tablet computers or notebook computers, the overall size of which is even as small as $(6 \text{ mm})^3$ or less. In order to accommodate the casing, the lens set, the voice coil motor (VCM) including coils and magnets, the frame for accommodating the lens set and VCM, and even the optical stabilization system (OIS) all within such a small volume, it is conceivably that, the sizes of these components must also be very tiny. For example, thicknesses of the outer rims of the lens set for winding the coil and the frame are usually close to or even smaller than 1 mm. Because components such like lens set and frame are primary made of plastic, structural strengths of these plastic components will be decreased due to miniaturized image capturing module. Especially, at the outer rims of both the lens set and the frame, the structural strengths are even weaker and inadequate since the thicknesses thereof are relatively thinner. However, during the operations when the lens set is driven to perform Auto-Focusing (AF) function or the frame is driven to perform OIS function, impacts occur from time to time between the lens set and the frame, or between the frame and the casing, and moreover, such impacts are mostly happened right at the outer rims of the lens set and the frame where are weakest in strength. Therefore, after a period of time of operations, it is very easy to find some deformations, ruptures or wear at the outer rims of the lens set and the frame caused by impacts and frictions, and thus results in defects such like decreased quality of images or malfunction of image capture module. Consequently, it is important to employ suitable material and structural designs when manufacturing the lens set of image capturing module in order to take care of both the strength of overall structural and accuracy of fitness of lenses mounted inside the lens set.

SUMMARY OF THE INVENTION

The primary objective of the present invention is to provide a lens module; in which, all or part of a metal embedded member is embedded in a rim portion with relatively thinner thickness of a lens unit or a frame in order to increase the structural strength, endure ability of impact and endure ability of friction at the rim portion of the lens unit or the frame.

Another objective of the present invention is to provide a lens module, wherein the embedded member comprises a plurality of protrusions which is exposed outside of the rim portion or the frame. When the lens unit moves relative to the frame, the positions where the lens unit might touch the frame are the locations of the protrusions. Therefore, these metal made protrusions can act as the impact positions between the lens unit and the frame to avoid contacts between plastic components, so as to prevent the lens unit and frame from deformations or damages due to impacts.

A further objective of the present invention is to provide a lens module, wherein the driving coils can be electrically connected with the protrusions of the embedded member, such that the electricity required by the coils can be transmitted via the embedded member, so as to improve the flexibility of circuitry design.

In order to achieve aforementioned objectives, the present invention discloses a lens module comprising a lens unit; said lens unit comprises:

a body, made of a first material, said body having a rim portion and a central through hole;

at least one lens, located in the central through hole of the body; an optical axis being defined by said at least one lens for allowing an external light to pass through the lens unit along the optical axis; and at least one embedded member, made of a second material; a hardness of the second material is greater than another hardness of the first material; wherein, at least a part of the embedded member is embedded within the rim portion of the body.

In a preferred embodiment, the first material is plastic, and, the second material is metal.

In a preferred embodiment, the second material is non-magnetic metal, said non-magnetic metal is one of the following: copper, copper alloy, stainless steel, aluminum, aluminum alloy, aluminum-magnesium alloy.

In a preferred embodiment, said at least one embedded member includes a plate-like structure conforming to the shape of the rim portion.

In a preferred embodiment, the lens module further comprises:

a frame, the lens unit being received in the frame and being movable relative to the frame in a limited distance; and a first driving module, furnished between the frame and the lens unit for driving the lens unit to move relative to the frame;

wherein, said at least one embedded member of the lens unit further includes at least one protrusion; said at least one protrusion is exposed outside of the rim portion of the body; when the lens unit moves relative to the frame, the frame provides a stopping function for restricting a movable range of the lens unit; in addition, the position at which the frame is touched on the lens unit is the position of one of said at least one protrusion.

In a preferred embodiment, the first driving module comprises: at least one coil and at least one magnet; said at least one coil is located on the rim portion of the lens unit, two ends of the coil is electrically connected with one of the at least one protrusion such that the embedded member can transmit electric current for the coil; said at least one magnet is located at the frame and is corresponding to said at least one coil.

In a preferred embodiment, the first driving module comprises two said coils which are electrically connected via the at least one embedded member.

In a preferred embodiment, said at least one coil is positioned on the rim portion of the body by means of said at least one protrusion.

In a preferred embodiment, the lens module further comprises: a sensing magnet and a position sensor; one of the sensing magnet and the position sensor being embedded at a predetermined location of the rim portion of the lens unit, while the other one of the sensing magnet and the position sensor being located on the frame.

In a preferred embodiment, the frame further comprises: a frame body made of plastic and a frame embedded member made of metal; the frame embedded member is embedded in the frame body to form said frame integrally; in addition, the frame embedded member further includes at least one frame protrusion which is exposed outside of the frame body.

In a preferred embodiment, when the lens unit moves relative to the frame, the position at which the lens unit is touched on the frame is the position of one of said at least one frame protrusion.

In a preferred embodiment, the lens module further comprises:

a case, the frame is located inside the case; and a second driving module, for driving the frame together with the lens unit to move horizontally relative to the case;

wherein, when the frame moves horizontally relative to the case, the case provides a stopping function for restricting a movable range of the frame; in addition, a location where the frame contacts the case is one of the at least one frame protrusion.

In order to achieve aforementioned objectives, the present invention also discloses a lens module, comprising:

a first component;

a second component; and a driving module, for driving one of the first component and the second component to move relative to the other;

wherein, the first component comprises an embedded member, a hardness of the embedded member is greater than another hardness of the first component; at least a part of the embedded member is embedded inside the first component; in addition, the embedded member has at least one protrusion which is exposed outside of the first component;

wherein, when one of the first component and the second component moves relative to the other, the first component is in contact with the second component by the at least one protrusion.

In a preferred embodiment, the first component is made of plastic, and, the embedded member is made of metal.

In a preferred embodiment, the first component is a bottom plate, the second component is a lens unit, the driving module is a first driving module;

wherein, the first driving module drives the lens unit to move relative to the bottom plate;

wherein, the lens unit comprises:

a body, said body has a rim portion and a central through hole; and at least one lens, located in the central through hole of the body; an optical axis is defined by said at least one lens for allowing an external light to pass through the lens unit along the optical axis;

wherein, at least a part of the embedded member is embedded within the bottom plate, in addition, said at least one protrusion is exposed outside of the bottom plate; moreover, when the lens unit moves relative to the bottom plate, the bottom plate provides a stopping function for restricting a movable range of the lens unit; furthermore, a location where the bottom plate contacts the lens unit is one of the at least one protrusion.

In a preferred embodiment, the first component is a lens unit, the second component is a case, the driving module is a first driving module;

wherein, the first driving module drives the lens unit to move relative to the case;

wherein, the lens unit comprises:

a body, said body has a rim portion and a central through hole; and at least one lens, located in the central through hole of the body; an optical axis is defined by said at least one lens for allowing an external light to pass through the lens unit along the optical axis;

wherein, at least a part of the embedded member is embedded within the lens unit, in addition, said at least one protrusion is exposed outside of the lens unit; moreover, when the lens unit moves relative to the case, the case provides a stopping function for restricting a movable range of the lens unit; furthermore, a location where the lens unit contacts the case is one of the at least one protrusion.

In a preferred embodiment, the second component comprises a second embedded member, hardness of said second embedded member is greater than that of the second component; at least a part of said second embedded member is embedded inside the second component; in addition, said second embedded member has at least one second protrusion which is exposed outside of the second component; when one of the first component and the second component moves relative to the other, the first component uses one of its said at least one protrusion to contact with one of said at least one second protrusion of the second component.

BRIEF DESCRIPTION OF THE DRAWINGS

The present invention will now be specified with reference to its preferred embodiment illustrated in the drawings, in which:

FIG. 15A and FIG. 15B are respectively a perspective assembled view (first perspective angle) and another perspective assembled view (second perspective angle) of the eighth embodiment of the lens unit of the lens module of the present invention;

DESCRIPTION OF THE PREFERRED EMBODIMENT

The invention disclosed herein is directed to a lens module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Generally speaking, a lens module of an image capturing module usually comprises a first component and a second component, in which one of these components is movable relative to the other. For example, for a lens module with auto-focus (AF) function, the lens unit can be considered as the first component, while the frame (or case, or bottom plate) for locating the lens unit can be considered as the second component; wherein the lens unit is suspended within the frame by at least one spring, and the lens unit (first component) is driven to move along an optical axis relative to the frame (or case, or bottom plate) (second component) by means of a driving module furnished between the lens unit (first component) and the frame (second component), so as to provide the AF function. If the lens module is equipped with optical image stabilization (OIS) function, then the frame together with the driving module and lens unit there-inside can be considered as the first component, while the circuit board (or case) below the frame can be considered as the second component; wherein the frame is suspended above the circuit board by a plurality of suspension wires, and the frame (first component) together with the driving module and lens unit there-inside are driven to move horizontally relative to the circuit board (second component) by means of a horizontal driving module furnished between the frame (first component) and the circuit board (second component), so as to provide the OIS function.

Figure 1:
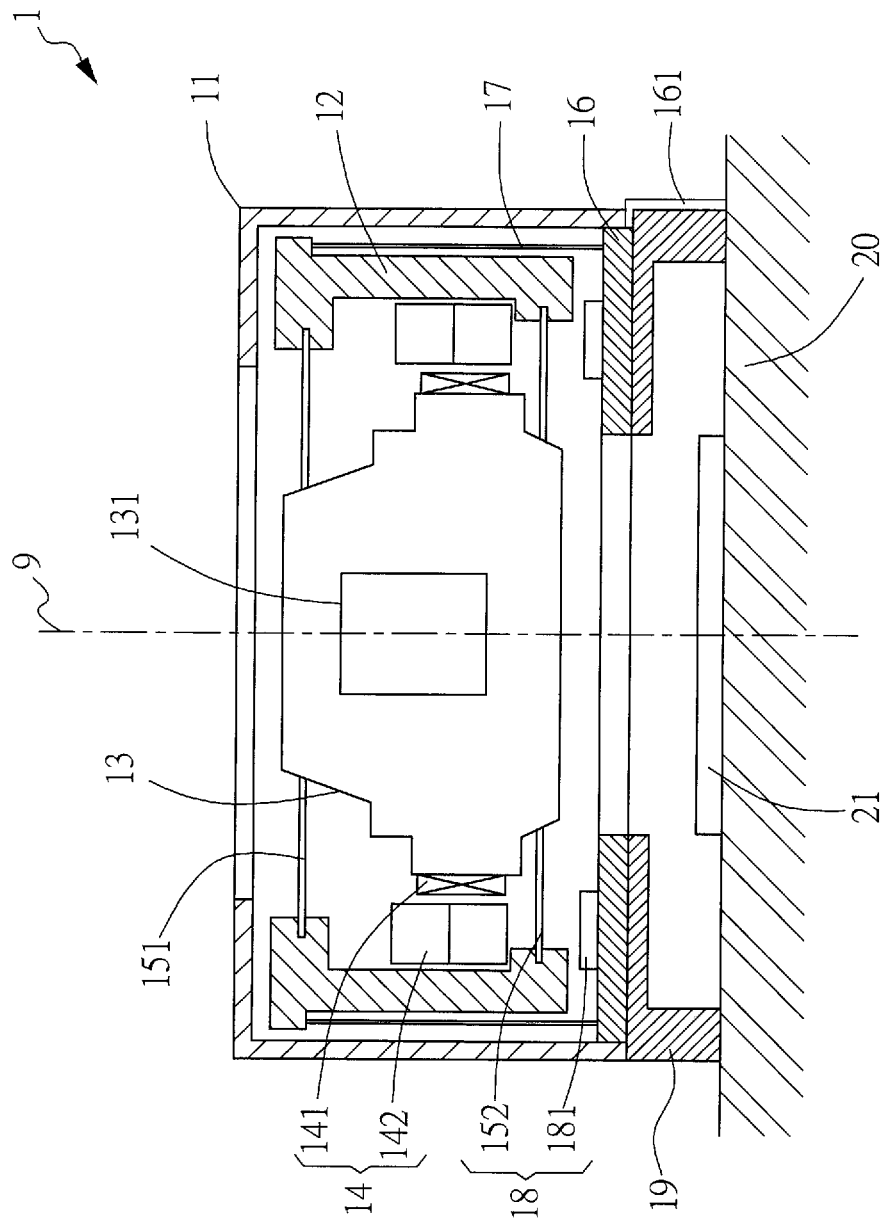
FIG. 1 is a schematic view of an embodiment of a fundamental structure of a lens module in accordance with the present invention.

Please refer to FIG. 1, which is a schematic view of an embodiment of a fundamental structure of a lens module in accordance with the present invention. As shown in the fundamental structure of FIG. 1, the lens module 1 is equipped with both the AF and OIS functions, and comprises: a case 11, a frame 12, a lens unit 13, a first driving module 14, at least one spring 151, 152, a circuit board 16, a plurality of suspension wires 17, a second driving module 18 and a bottom plate 19.

The case 11 is a hollow lid-like structure, which has an opening at middle of the top surface for light to pass through. The area inside the case 11 is empty. The frame 12 is located inside the case 11, but does not directly contact nor directly fix to the case 11. The frame 12 has an inner compartment and a plurality of positioning slots. The lens unit 13 is received within the inner compartment of the frame 12 in such a manner that, the lens unit 13 is movable relative to the frame 12 in a limited distance. The lens unit 13 is mounted with at least one lens which defines an optical axis 9 for the external image light to pass through the lens unit 13. The first driving module 14 is furnished between the frame 12 and the lens unit 13 for driving the lens unit 13 to move relative to the frame 12 (or case 11 or bottom plate 19) along the optical axis 9 in order to provide the AF function. In this embodiment, the first driving module comprises at least one coil 141 and a plurality of driving magnets 142. The coil 141 is located at a rim portion of the lens unit 13, while the driving magnets 142 are located at the positioning slots of the frame 142 and are corresponding to the coil 141. By applying electric currents to the coil 141, the lens unit 13 can be driven to move along the optical axis 9 relative to the frame 12; in addition, the case 11 and the frame 12 provide a stopping function respectively at the top end and the bottom end of the lens unit 13 for restricting a movable range of the lens unit 13. The springs 151, 152 are connected between the frame 12 and the lens unit 13 and are located respectively at the top end and the bottom end of the lens unit 13. The outer rims of the springs 151, 152 are fixed on the frame 12, while the inner portions of the springs 151, 152 are fixed on the lens unit 13, so as to elastically support the lens unit 13 inside the frame 12, and also to constraint the lens unit 13 to move a limited distance along the optical axis 9 relative to the frame 12. In addition, when the current supplied to the coil 141 is stopped, the lens unit 13 will be pulled back to an initial position due to the elastic forces of the springs 151, 152. The circuit board 16 is located under the frame 12 but does not directly contact to both the frame 12 and the lens unit 13. The second driving module 18 is furnished between the frame 12 and the circuit board 16 for driving the frame 12 together with the lens unit 13 to move horizontally relative to the circuit board 16 (or case 11) in order to provide the OIS function. In this embodiment, the second driving module 18 includes a plurality of horizontal circuits 181 furnished on the circuit board 16 and those driving magnets 142 mounted on the frame 12. That is, in this embodiment, the driving magnets 142 are shared by the first and second driving modules 14, 18. However, in another embodiment not shown in figures, the first and second driving modules 14, 18 can have their own magnets; which means, the second driving module 18 will have its own horizontal magnets furnished on the frame 12 at locations near and corresponding to those horizontal coils 181. The suspension wires 17 are extending between the frame 12 and the circuit board 16 for suspending the frame 12 above the circuit board 16 in such a manner that, the frame 12 is movable relative to the circuit board 16 in a limited distance horizontally. The bottom plate 19 is located below the circuit board 16 and is fixed to the case 11 and the circuit board 16. In this embodiment, the upper end of each suspension wire 17 is fixed to a corner of the frame 12, while the bottom end of each suspension wire 17 is passing through the circuit board 16 and then fixed to a corner of the bottom plate 19, so as to accommodate all of the aforementioned components between the case 11 and the bottom plate 19 to be the integrated lens module 1. The whole set of lens module 1 can be assembled to an external circuit 20 by using the bottom plate 19, allowing an image sensor 21 of the external circuit 20 to be located on the optical axis 9 and right below the lens unit 13 of the lens module 1. In the meantime, a connecting board 161 extending downward from a side of the circuit board 16 is electrically connected to the external circuit 20. Therefore, image light coming from outside can be focused on the image sensor 21 by the lens unit 13 of the lens module 1, and is then transformed to electric signals that can be processed by a computer, so as to provide image capturing functions of the image capturing module.

In the present invention, the lens module 1 is furnished in an image capturing module of a portable electronic device such like a smart phone, tablet computer or notebook computer. Which means, the aforementioned external circuit 20 is the electronic circuit connecting to the portable electronic device. In order to fulfill the design of miniaturization, the size in length-width-height of the image capturing module is usually smaller than $(10 \text{ mm})^3$ or even smaller than $(6 \text{ mm})^3$. The thicknesses of the rim portion of the lens unit 13 wounded with the coil 141 and the rim portion of the frame 12 are usually close to or even thinner than 1 mm. The rim portion which has relatively thinnest thickness not only is relatively weaker in structure but also is the location where impacts are mostly likely to happen when the lens unit 13 is moving relative to the frame 12. Since components such like the lens unit 13 and the frame 12 are primary made of plastic, therefore the structural strength of the rim portions of the lens unit 13 and the frame 12 will be insufficient if plastic is the only material used in the lens unit 13 and the frame 12. After a period of time of usage, it is easy to cause deformation, cracking or wear of the rim portion of lens module 13 or the rim portion of frame 12 due to repeated impacts and frictions. Therefore, the primary concept of the present invention is to partially or completely embed a metal embedded member within the thinner rim portion of the lens unit 13 or the frame 12 by a plastic insert-molding process or other processes. The structural strength, endure ability of impact and endure ability of friction at the rim portion of the lens unit or the frame 12 are increased by the metal embedded member which has a structural strength and a hardness better than that of plastic.

In other embodiments of the present invention described below, most of the elements are the same or similar to the ones illustrated in previous embodiments; therefore, the same or similar elements will be given the same name and number, or an additional alphabet will be added after the numbering for distinguishing similar elements.

Figure 2:
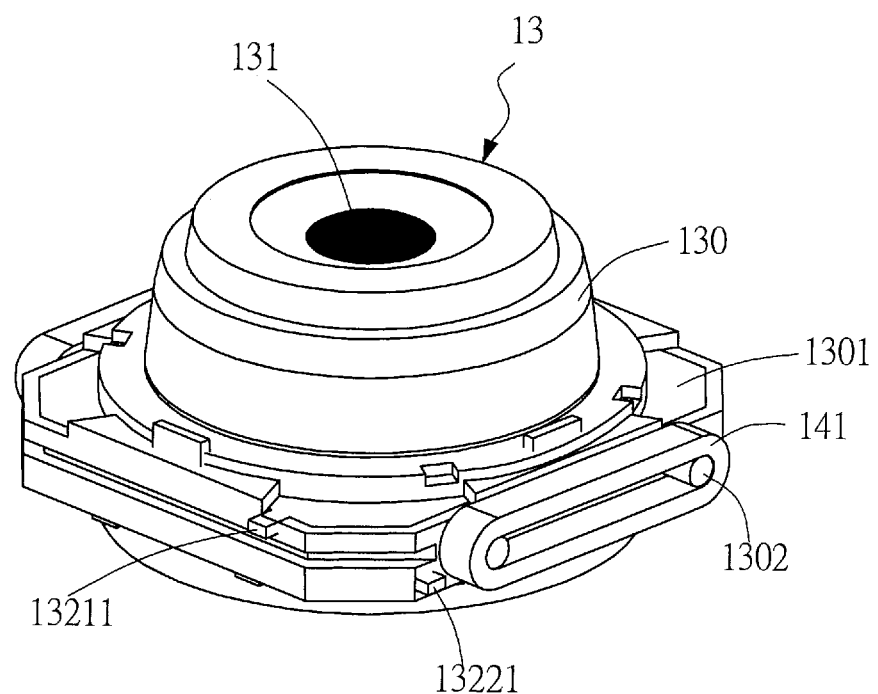
FIG. 2 is a perspective view of a first embodiment of a lens unit of the lens module in accordance with the present invention.
Figure 3A:
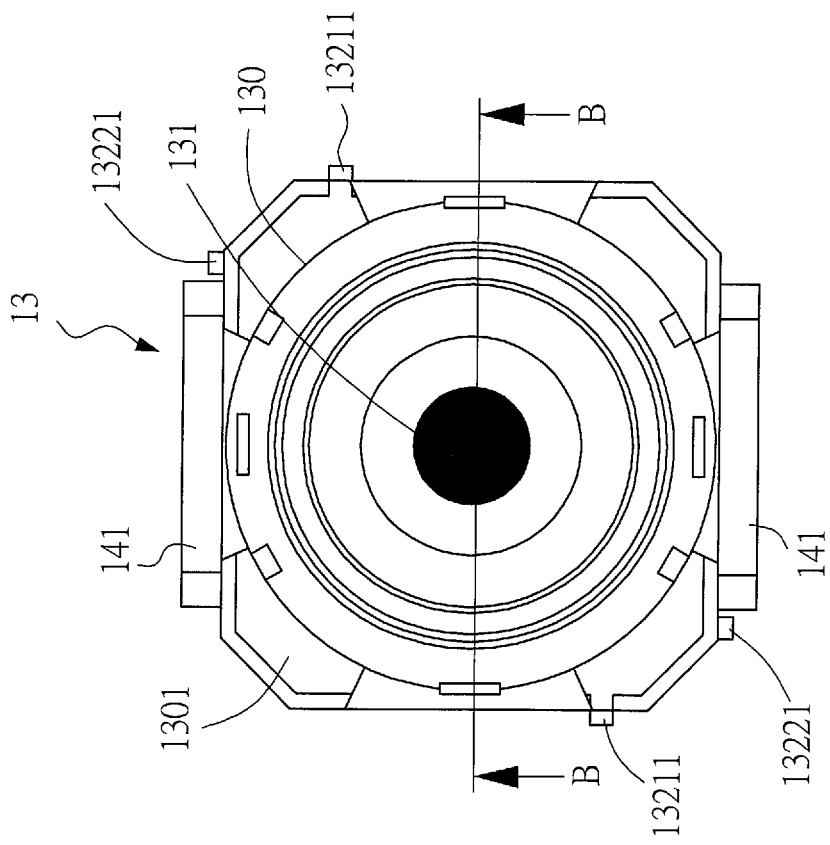
FIG. 3A is a top view of the first embodiment of the lens unit of the lens module in accordance with the present invention.
Figure 3B:
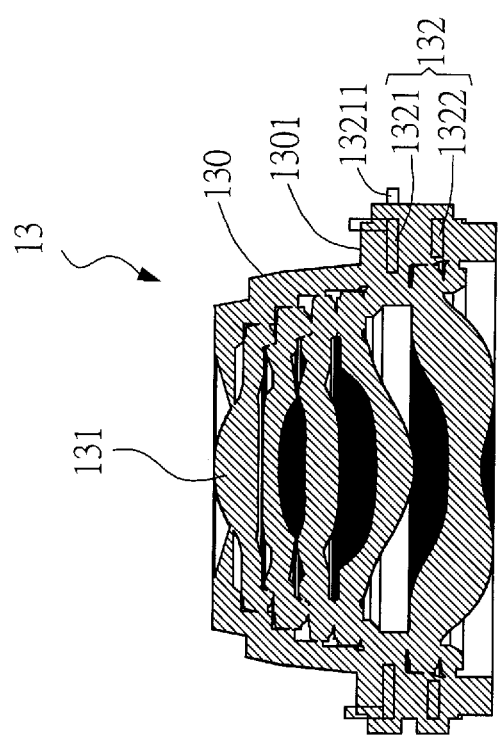
FIG. 3B is a B-B cross-sectional view of the first embodiment of the lens unit of the lens module in accordance with the present invention.
Figure 4:
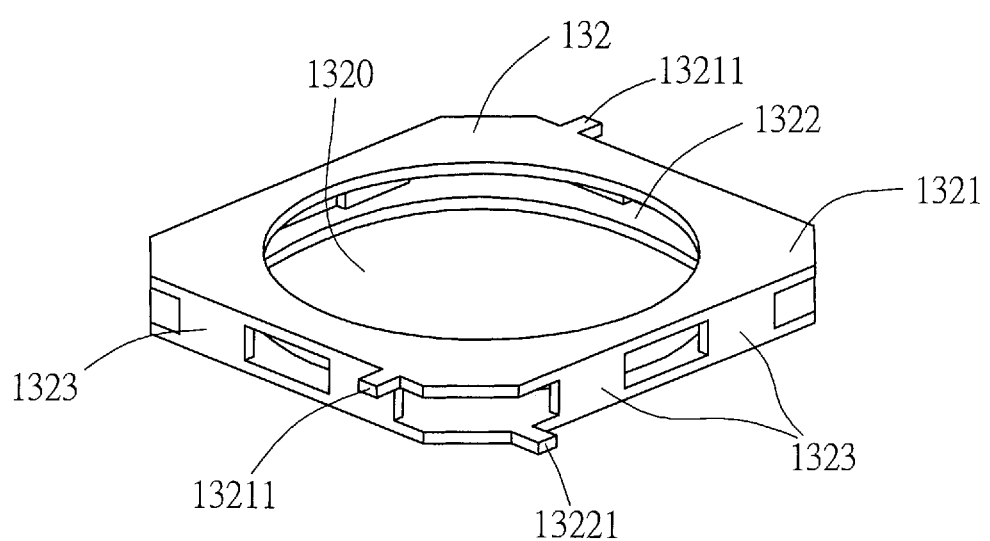
FIG. 4 is a perspective view of the embedded member of the lens unit of the first embodiment of the present invention as shown in FIG. 3B.

Please refer to FIG. 2, FIG. 3A, FIG. 3B and FIG. 4. In which, FIG. 2, FIG. 3A and FIG. 3B are respectively a perspective view, a top view, and a B-B cross-sectional view of a first embodiment of a lens unit of the lens module in accordance with the present invention. FIG. 4 is a perspective view of the embedded member of the lens unit of the first embodiment of the present invention as shown in FIG. 3B.

As shown in FIG. 2, in the first embodiment of the present invention, the lens unit 13 further comprises: a body 130, at least one lens 131, and at least one embedded member 132 (see also FIG. 4). The body 130 is made of a first material. The body 130 has a rim portion 1301, a central through hole, and a plurality of positioning elements 1302. The positioning elements 1302 can be wound or fitted by the coil 141 to achieve the function of fixing the coil 141 to the positioning elements 1302. In this embodiment, the coil 141 can be a flat coil to reduce space and increase strength. The at least one lens 131 is located at the central through hole of the body 130. An optical axis can be defined by the at least one lens 131 for an external image light to pass through the lens unit 13 along the optical axis. The at least one embedded member 132 is made of a second material, and the hardness of the second material is greater than the hardness of the first material. The lens unit 13 is integrally formed by embedding the at least one lens 131 and the at least one embedded member 132 into the body 130 by a plastic insert-molding process or other processes. At least a major part of the embedded member 132 is embedded in the rim portion 1301 of the body 13 by the plastic insert-molding process or the like. The term "major part" recited herein means more than 50% of the length of any side of the embedded member 132. In this embodiment, the first material is plastic and the second material is metal. More precisely speaking, the second material is preferably a non-magnetic metal, and the non-magnetic metal may be, but not limited to, one of the following: copper, copper alloy, stainless steel, aluminum, aluminum alloy, aluminum-magnesium alloy. Among them, copper and copper alloys have better conductivity; stainless steel has the property of being less rusting, aluminum and aluminum alloys have lighter weight, and aluminum-magnesium alloys have lighter weight and better strength. The advantage of using the non-magnetic metal to form the embedded member 132 is that it does not affect the normal operation of the driving module 14 or the position sensor (not shown in this figure). However, according to a further embodiment of the present invention, the second material can also be a magnetic material such as magnet. Thereby, the embedded member (which is made of magnet) can provide the same function as the driving magnet, which not only can improve the structural strength at the rim portion, but also can co-work with the coil (not shown in figures) disposed on the frame to form a moving-magnet-typed electromagnetic driving module (not shown in figures) for driving the lens unit to move along the optical axis.

It is to be noted that, the body 130 and the at least one lens 131 of the lens unit 13 can be separate components, or, the at least one lens 131 can be directly adhered to the body 130 by adhesives in order to bond them into an integrated component, so as to make the lens unit 13 to be the form of UNILENS.

In an embodiment not shown in figures, the embedded member 132 is disposed only on the surface of the body 130 and is not embedded in the body 130; such that, the structural strength of the body 130 can still be increased in order to avoid damages or deformations.

In the first embodiment shown in FIG. 4, the embedded member 132 further comprises: two plate-like structures 1321, 1322 conforming to the shape of the rim portion, a plurality of connecting portions 1323 extending and connecting between the two plate-like structures 1321, 1322, and a plurality of protrusions 13211, 13221 protruding sideward from a side of the two plate-like structures 1321, 1322. Preferably, the embedded member 132 can be manufactured by stamping, however, the embedded member 132 can also be manufactured by die casting or forging. In the present embodiment, each of the two plate-like structures 1321, 1322 is in the form of a closed annular metal plate having a through hole 1320 in the center, but the outer periphery of the through hole 1320 is a complete unopened annular plate, such that the plate-like structures 1321, 1322 can have better structural strength. The two plate-like structures 1321, 1322 are horizontally extended and are not in direct contact with each other, but the two plate-like structures 1321, 1322 are connected by the connecting portions 1323 to form the integral embedded member 132. In addition, except for those connecting portions 1323, other areas between the two plate-like structures 1321, 1322 are hollowed out to reduce the weight while still maintaining the structural strength of the embedded member 132. When the embedded member 132 is insert-molded into the rim portion 1301 of the body 130, the protrusions 13211, 13221 are exposed outside the rim portion 1301 of the body 130. Moreover, since the positions of the protrusions 13211, 13221 are protruding outward at the outer rim portion 1301 of the lens unit 13, when the lens unit 13 impacts or frictions against the adjacent objects, the protrusions 13211, 13221 will become the impact points of the lens unit 13. In other words, when the lens unit 13 performs displacements relative to the frame 12, the lens unit 13 may touch the frame 12, and at this time, the location where the lens unit 13 is touched is one of the protrusions 13211, 13221. Therefore, the present invention embeds the embedded member 132 which is made of non-magnetic metal material having high hardness and strength into the rim portion 1301 of the plastic body 130 of the lens unit 13 by means of insert-molding process, not only can improve the structural strength at the rim portion 1301, but also can allow the metal protrusions 13211, 13221 to protrude outside of the rim portion 1301 to become the impact points in order to prevent the rim portion 1301 of the lens unit 13 from being deformed, broken or worn due to repeated impacts and frictions, so as to improve the deficiencies of prior arts. Furthermore, in another embodiment of the invention, the two coils 141 located on opposite sides of the lens unit 13 can also be electrically connected by the at least one embedded member 132, not only the embedded member 132 can become a conductive passage for the driving currents required by the coil 141 to transmit there-through, but also the end of the coil 141 can be welded to an adjacent protrusion 13221 to facilitate the wire-bonding process.

Figure 5A:
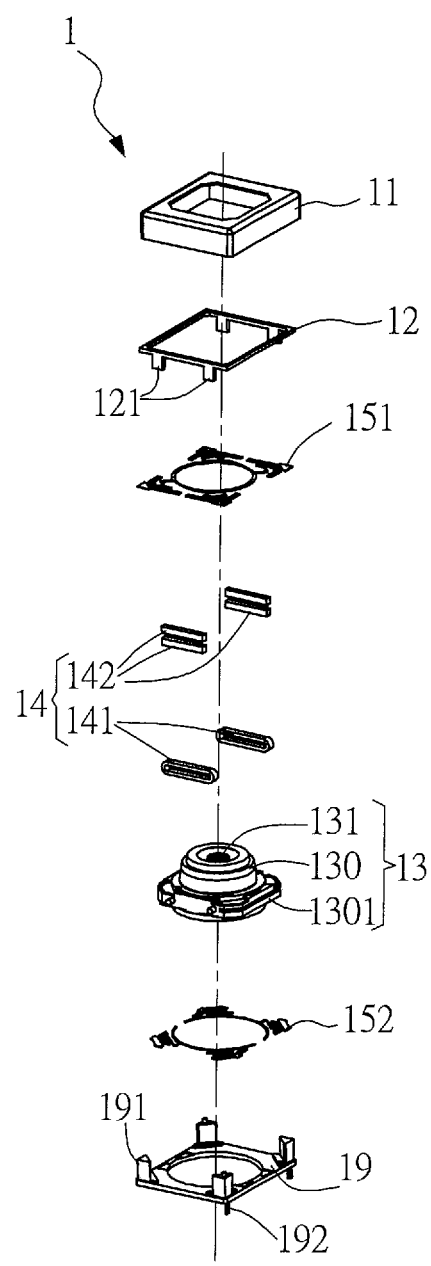
FIG. 5A and FIG. 5B are respectively a perspective exploded view and a perspective assembled view of a second embodiment of the lens module of the present invention.
Figure 5B:
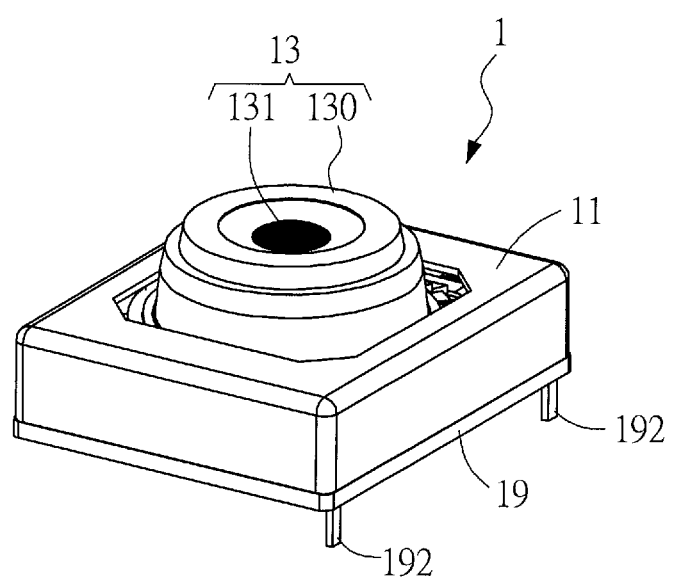

Please refer to FIG. 5A and FIG. 5B, which are respectively a perspective exploded view and a perspective assembled view of a second embodiment of the lens module of the present invention. In the second embodiment, the lens module 1 has only an auto-focus (AF) function and no OIS function, and the lens module 1 comprises: a case 11, a frame 12, a lens unit 13, a driving module 14, two springs 151, 152 and a bottom plate 19.

The case 11 is a hollow lid-like structure, which has an opening at middle of the top surface for light to pass through. The area inside the case 11 is empty. The frame 12 is located inside the case 11, in addition, the frame 12 has an inner compartment and a plurality of positioning blocks 121. The lens unit 13 is received within the inner compartment of the frame 12 in such a manner that, the lens unit 13 is movable relative to the frame 12 in a limited distance. The lens unit 13 is mounted with at least one lens 131 which defines an optical axis for the external image light to pass through the lens unit 13. The driving module 14 is furnished between the frame 12 and the lens unit 13 for driving the lens unit 13 to move relative to the frame 12 and the case 11 along the optical axis. In addition, the case 11 and the frame 12 respectively provide a stopping function on the upper end and the lower end of the lens unit 13 to limit the moving range of the upper end and the lower end of the lens unit 13 in the optical axis direction. In the second embodiment, the driving module 14 comprises two coils 141 and two set of driving magnets 142. Each set of driving magnets 142 includes two elongated unipolar radial magnetized magnets arranged in parallel in an upper and lower configuration, and the magnetic poles of the upper and lower magnets of the same set of driving magnets 142 facing the lens unit 13 are opposite. However, two magnets of different sets of driving magnets 142, which are both the upper (or lower) magnets of the two sets of driving magnets 142, have the same magnetic poles facing the lens unit 13. The two coils 141 are located at two opposite sides of a rim portion 1301 of the lens unit 13, while the two sets of driving magnets 142 are located between the positioning blocks 121 of the frame 142 and are corresponding to the coils 141. By applying electric currents to the coils 141, the lens unit 13 can be driven to move along the optical axis relative to the frame 12. The two springs 151, 152 are connected between the frame 12 and the lens unit 13 and are located respectively at the top end and the bottom end of the lens unit 13. The outer rims of the springs 151, 152 are fixed on the frame 12, while the inner portions of the springs 151, 152 are fixed on the lens unit 13, so as to elastically support the lens unit 13 inside the frame 12, and also to constraint the lens unit 13 to move a limited distance along the optical axis relative to the frame 12. In addition, when the current supplied to the coils 141 is stopped, the lens unit 13 will be pulled back to an initial position due to the elastic forces of the springs 151, 152. The bottom plate 19 is located below the frame 12 and is fixed to the case 11 and the frame 12. The case 11 is sleeved and fixed to a plurality of fixing bars 191 of the bottom plate 19, so as to accommodate the aforementioned components between the case 11 and the bottom plate 19 to form an integrated lens module 1. The whole set of lens module 1 can be assembled to an external circuit (not shown in this figure) by using the bottom plate 19, allowing an image sensor (not shown in this figure) of the external circuit to be located on the optical axis and right below the lens unit 13 of the lens module 1. In the meantime, a pair of connecting pins 192 extending downward from a side of the bottom plate 19 are electrically connected to the external circuit. Therefore, image light coming from outside can be focused on the image sensor by the lens unit 13 of the lens module 1, and is then transformed to electric signals that can be processed by a computer, so as to provide image capturing functions of the image capturing module.

Figure 6:
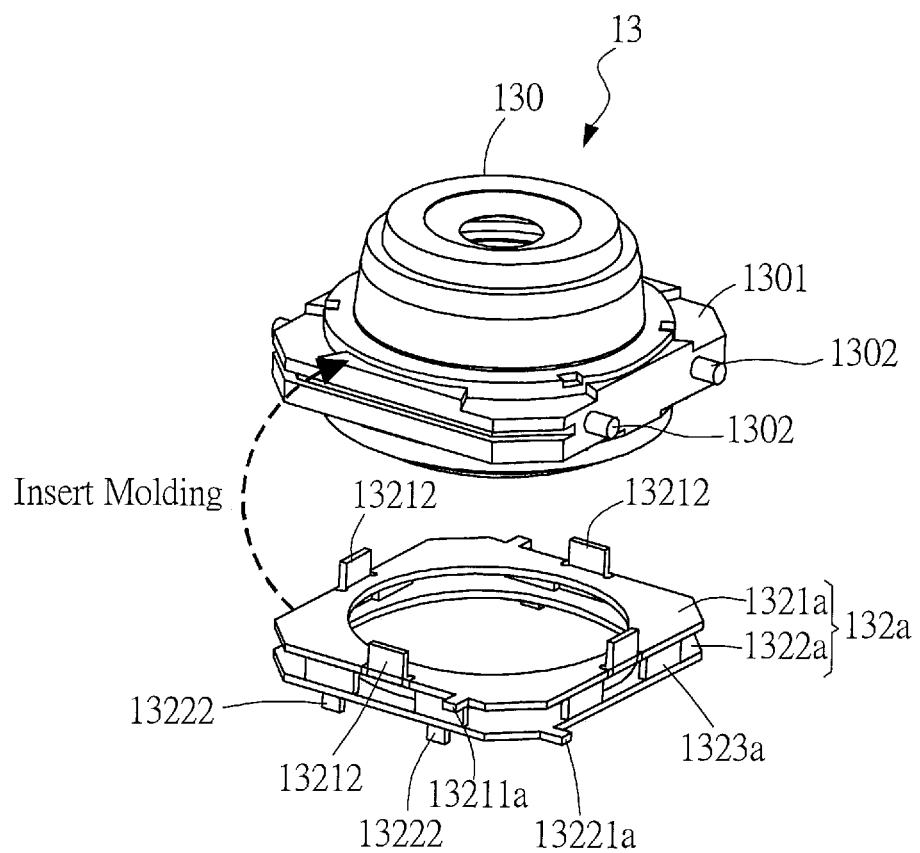
FIG. 6 is a perspective exploded view of the third embodiment of the lens unit of the lens module of the present invention.
Figure 7B:
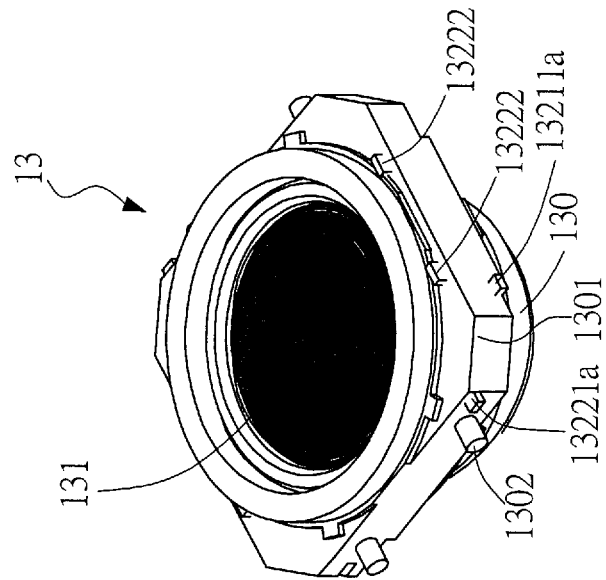
FIG. 7B is another perspective assembled view (second perspective angle) of the third embodiment of the lens unit of the lens module of the present invention.
Figure 7A:
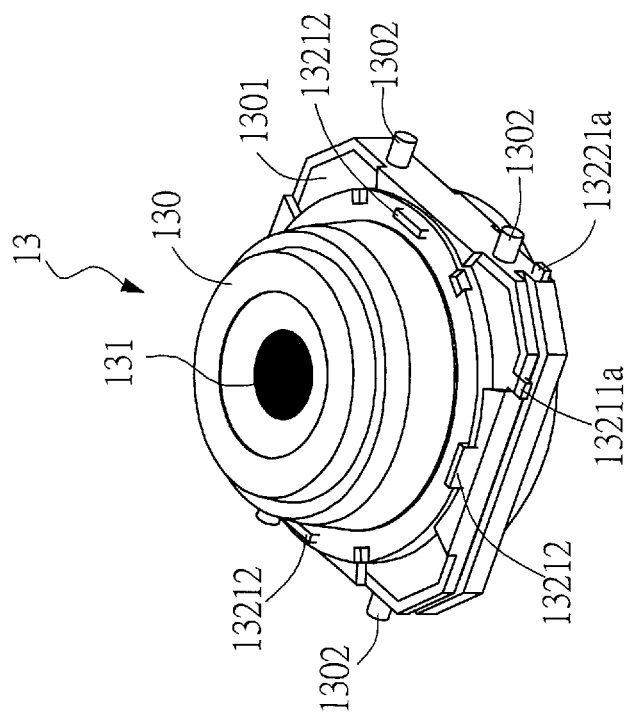
FIG. 7A is a perspective assembled view (first perspective angle) of the third embodiment of the lens unit of the lens module of the present invention.

Please refer to FIG. 6, FIG. 7A and FIG. 7B, which are respectively a perspective exploded view, a perspective assembled view (first perspective angle), and another perspective assembled view (second perspective angle) of the third embodiment of the lens unit of the lens module of the present invention. In the third embodiment, most of the structure of the lens unit 13 is the same as that of the lens unit in the first embodiment of the present invention shown in FIG. 2, and the only difference is that the structures of the embedded members 132 and 132a of these two embodiments are different.

In the third embodiment shown in FIG. 6, the embedded member 132a is also embedded in the rim portion 1301 of the body 130 of the lens unit 13. In addition, the embedded member 132a also comprises: two plate-like structures 1321a, 1322a conforming to the shape of the rim portion 1301, a plurality of connecting portions 1323a extending and connecting between the two plate-like structures 1321a, 1322a, and a plurality of protrusions 13211a, 13221a protruding sideward from a side of the two plate-like structures 1321a, 1322a. Moreover, in this third embodiment, the embedded member 132a further comprises a plurality of additional protrusions 13212, 13222 protruding upward or downward from a side of the two plate-like structures 1321*a*, 1322*a*. As shown in FIG. 7A and FIG. 7B, when the embedded member 132*a* is insert-molded into the rim portion 1301 of the body 130, not only the protrusions 13211*a*, 13221*a* protruding sideward are exposed outside a side surface of the rim portion 1301*a* of the body 130*a*, but also the additional protrusions 13212, 13222 protruding upward or downward are exposed outside an upper surface or a lower surface of the rim portion 1301*a* of the body 130*a*. In addition to that the metal embedded member 132*a* itself can improve the structural strength of the rim portion 1301, and the protrusions 13211*a*, 13221*a* protruding sideward from the rim portion 1301 can be used as the impact points of the lens unit 13 in the lateral direction, the additional protrusions 13212, 13222 protruding upward or downward from the rim portion 1301 can also be used as the impact points of the lens unit 13 when it moves along the optical axis, or when the lens unit 13 contacts or impacts the springs 151, 152, the case 11, or the bottom plate 19. Furthermore, in another embodiment of the invention, the two coils 141 can be electrically connected by the embedded member 132*a*, not only the embedded member 132*a* can become a conductive passage for the driving currents required by the coils 141 to transmit there-through, but also the end of the coils 141 can be welded to an adjacent protrusion to facilitate the wire-bonding process.

Figure 8:
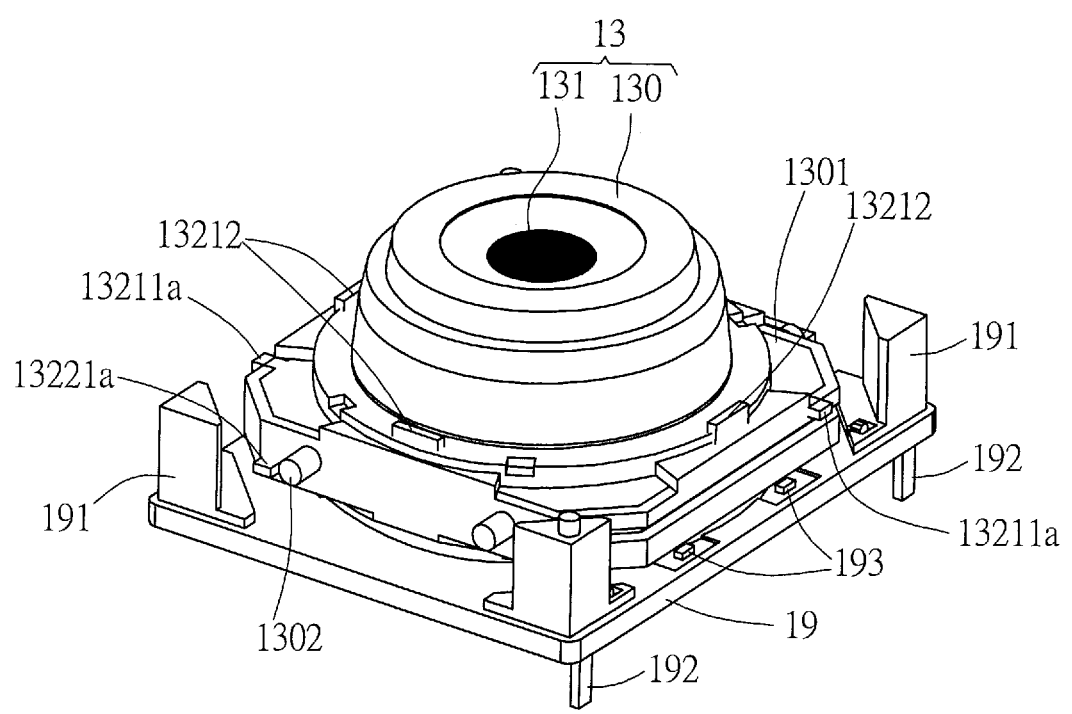
FIG. 8 is a perspective view of the lens unit placed on the bottom plate of the third embodiment of the present invention as shown in FIG. 6.

Please refer to FIG. 8, which is a perspective view of the lens unit placed on the bottom plate of the third embodiment of the present invention as shown in FIG. 6. In this embodiment, the plastic bottom plate 19 can also be embedded with a metal embedded member (not shown in this figure) by using the plastic insert-molding process or other processes. In addition, a plurality of protrusions 193 projected upwardly are also provided on the embedded member such that the protrusions 193 can protrude upward and be exposed to the upper surface of the bottom plate 19. When the lens unit 13 is driven by the first driving module to move relative to the bottom plate 19 along the optical axis, the bottom plate 19 provides a stopping function for the lower end of the lens unit 13 to limit the moving range of the lens unit 13. The positions of the upwardly projected protrusions 193 exposed on the upper surface of the bottom plate 19 respectively correspond to the positions of the additional protrusions 13222 protruding downward from the lower surface of the rim portion 1301 of the lens unit 13, such that the protrusions 193 can serve as impact points for contacting or impacting the corresponding additional protrusions 13222 of the lower surface of the rim portion 1301 of the lens unit 13. The structural strength, impact resistance and wear resistance of the bottom plate 19 can be improved by the metal embedded member which are embedded in the bottom plate 19 by the insert-molding process. Moreover, since the protrusions 193 of the bottom plate 19 and the corresponding additional protrusions 13222 of the lens unit 13 are both made of metal, not only the metal has better flatness and better tilt angle than plastic, but also the impacts between metal components will generate fewer particles than the impacts between plastic components.

Figure 9:
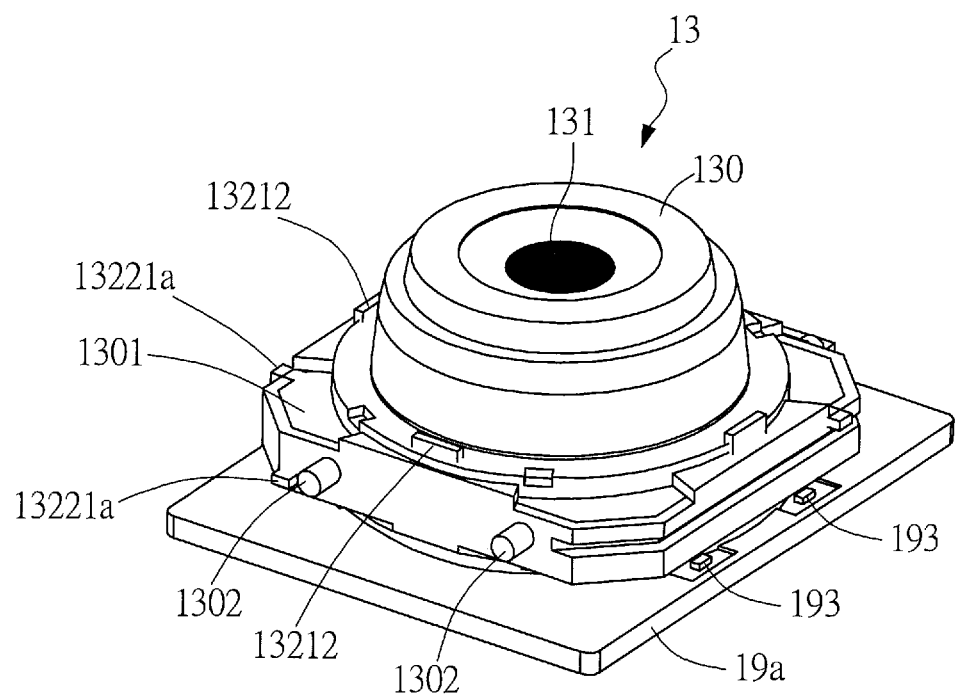
FIG. 9 is a perspective view of the lens unit shown in FIG. 6 being placed on a metal bottom plate of the fourth embodiment of the present invention.

Please refer to FIG. 9, which is a perspective view of the lens unit shown in FIG. 6 being placed on a metal bottom plate of the fourth embodiment of the present invention. The difference between the fourth embodiment and the embodiment shown in FIG. 8 is that, in the fourth embodiment shown in FIG. 9, the bottom plate 19*a* is made of a metal plate, in addition, the upper surface of the metal bottom plate 19*a* is also provided with a plurality of upwardly projected protrusions 193, such that the protrusions 193 can serve as impact points for contacting or impacting the corresponding additional protrusions 13222 of the lower surface of the rim portion 1301 of the lens unit 13. The structural strength, impact resistance and wear resistance of the bottom plate 19 are significantly improved because the whole bottom plate 19 is made of metal. Moreover, since the protrusions 193 of the bottom plate 19 and the corresponding additional protrusions 13222 of the lens unit 13 are both made of metal, not only the metal has better flatness and better tilt angle than plastic, but also the impacts between metal components will generate fewer particles than the impacts between plastic components.

Figure 10:
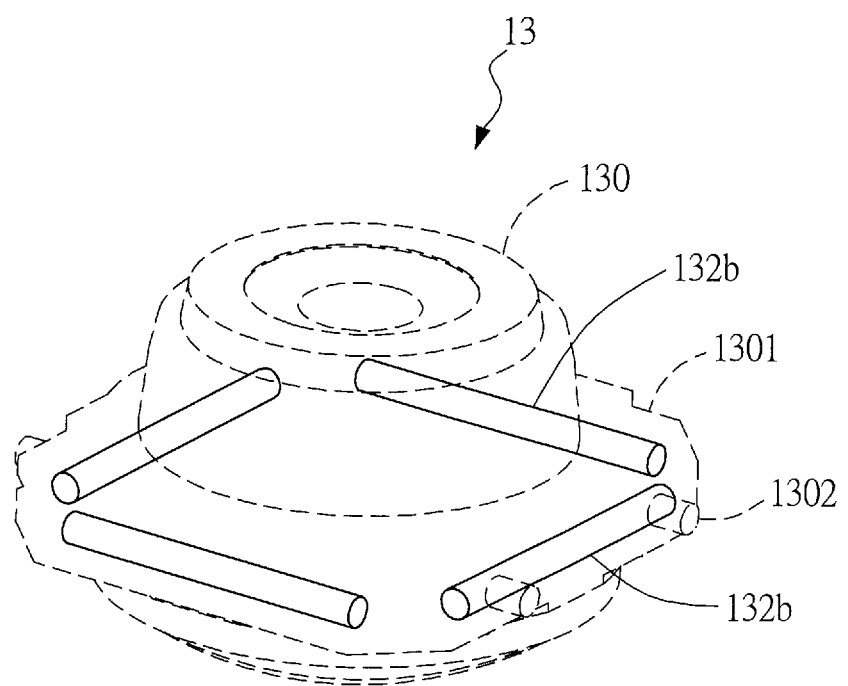
FIG. 10 is a perspective view of a fifth embodiment of the lens unit of the lens module of the present invention.

Please refer to FIG. 10, which is a perspective view of a fifth embodiment of the lens unit of the lens module of the present invention. The difference between the fifth embodiment and the third embodiment shown in FIG. 6 is that, in the fifth embodiment shown in FIG. 10, the embedded members 132*b* include a plurality of elongated rod-like structures (for example, elongated round bars) which are embedded inside the rim portion 1301 of the lens unit 13 in such a manner that, these elongated rod-like structures are configured to surround a relatively thinner peripheral portion (that is, the rim portion 1301) of the lens unit 13. In this embodiment, the elongated rod-like embedded members 132*b* can be completely embedded in the rim portion 1301 of the body 130 of the lens unit 13 in order to improve the structural strength; or, the two ends of each of the elongated rod-like embedded members 132*b* may also protrude and expose outside of the rim portion 1301 of the body 130 of the lens unit 13, such that, not only the structural strength of the rim portion 1301 can be improved, but also these protruded ends of the embedded members 132*b* can serve as the protrusions for providing the function of impact points, or serve as the positioning elements for winding or positioning the coils.

Figure 11:
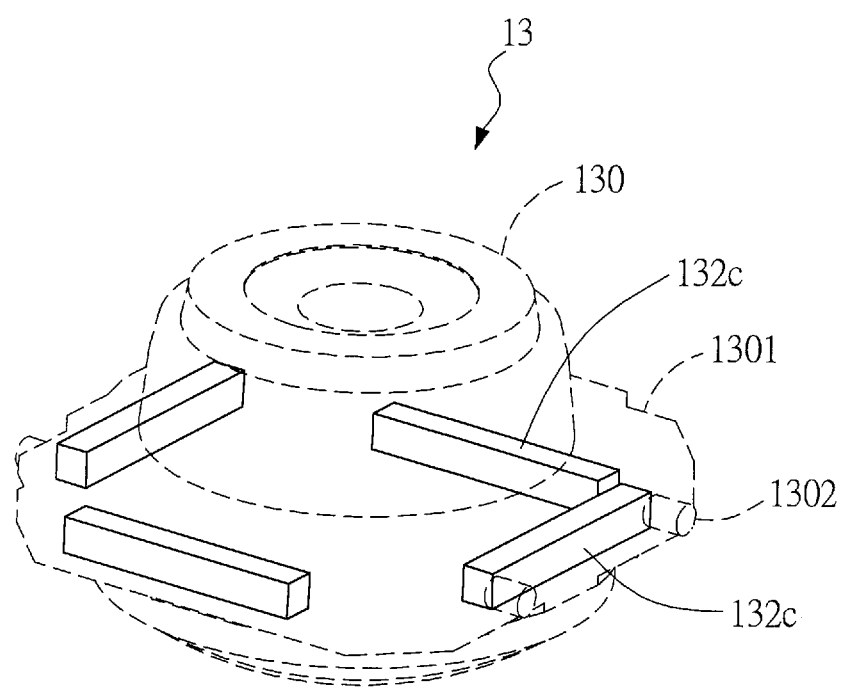
FIG. 11 is a perspective view of a sixth embodiment of the lens unit of the lens module of the present invention.

Please refer to FIG. 11, which is a perspective view of a sixth embodiment of the lens unit of the lens module of the present invention. The difference between the sixth embodiment and the fifth embodiment shown in FIG. 10 is that, in the sixth embodiment shown in FIG. 11, the embedded members 132*c* include a plurality of elongated rod-like magnets (for example, magnets in the shapes of elongated cuboids) which are embedded inside the rim portion 1301 of the lens unit 13 in such a manner that, these elongated rod-like magnets are configured to surround a relatively thinner peripheral portion (that is, the rim portion 1301) of the lens unit 13. In this embodiment, the elongated rod-like embedded members 132*b* (magnets) can be completely embedded in the rim portion 1301 of the body 130 of the lens unit 13 in order to improve the structural strength. In addition, these embedded members 132*b* (magnets) can also provide the same function as the driving magnet to co-work with the coil (not shown in figures) disposed on the frame to form a moving-magnet-typed electromagnetic driving module (not shown in figures) for driving the lens unit to move along the optical axis.

Figure 12:
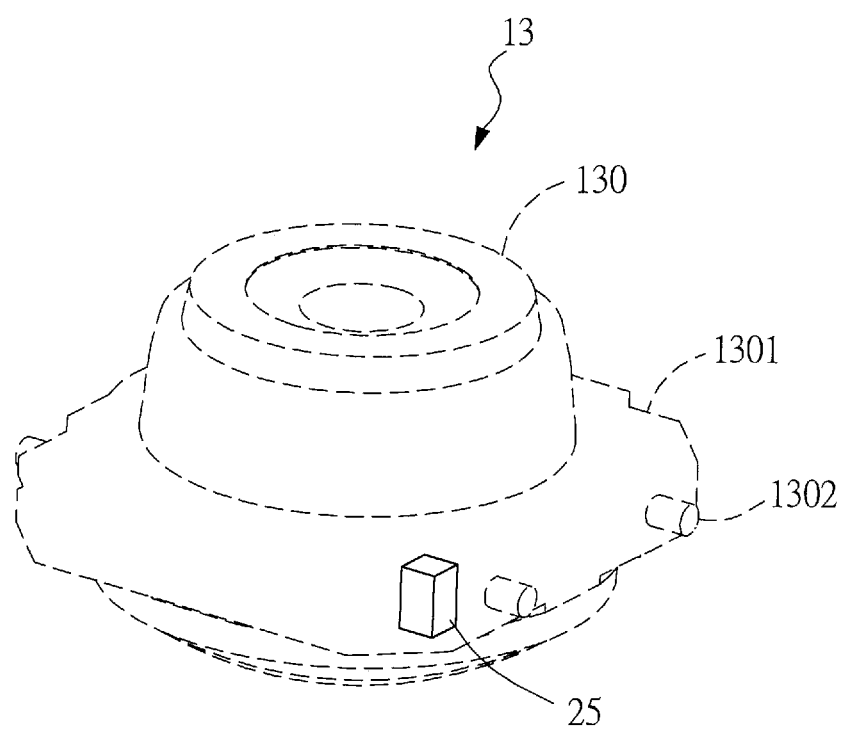
FIG. 12 is a perspective view of the seventh embodiment of the lens unit of the lens module of the present invention.

Please refer to FIG. 12, which is a perspective view of the seventh embodiment of the lens unit of the lens module of the present invention. The difference between the seventh embodiment and the third embodiment shown in FIG. 6 is that, in the seventh embodiment shown in FIG. 12, the lens module further comprises a sensing magnet 25 and a position sensor (not shown in this figure). One of the sensing magnet 25 and the position sensor is partially embedded or fully embedded in a predetermined location of the rim portion 1301 of the lens unit 13 by a plastic insert-molding process or other processes, in addition, the other one of the sensing magnet 25 and the position sensor is located on the frame. In this embodiment, the one to be embedded in the rim portion 1301 is preferably the sensing magnet 25, and the sensing magnet 25 is partially (such like a side surface thereof) exposed outside of the side surface of the rim portion 1301 and is corresponding to the position sensor mounted on the frame.

Figure 13A:
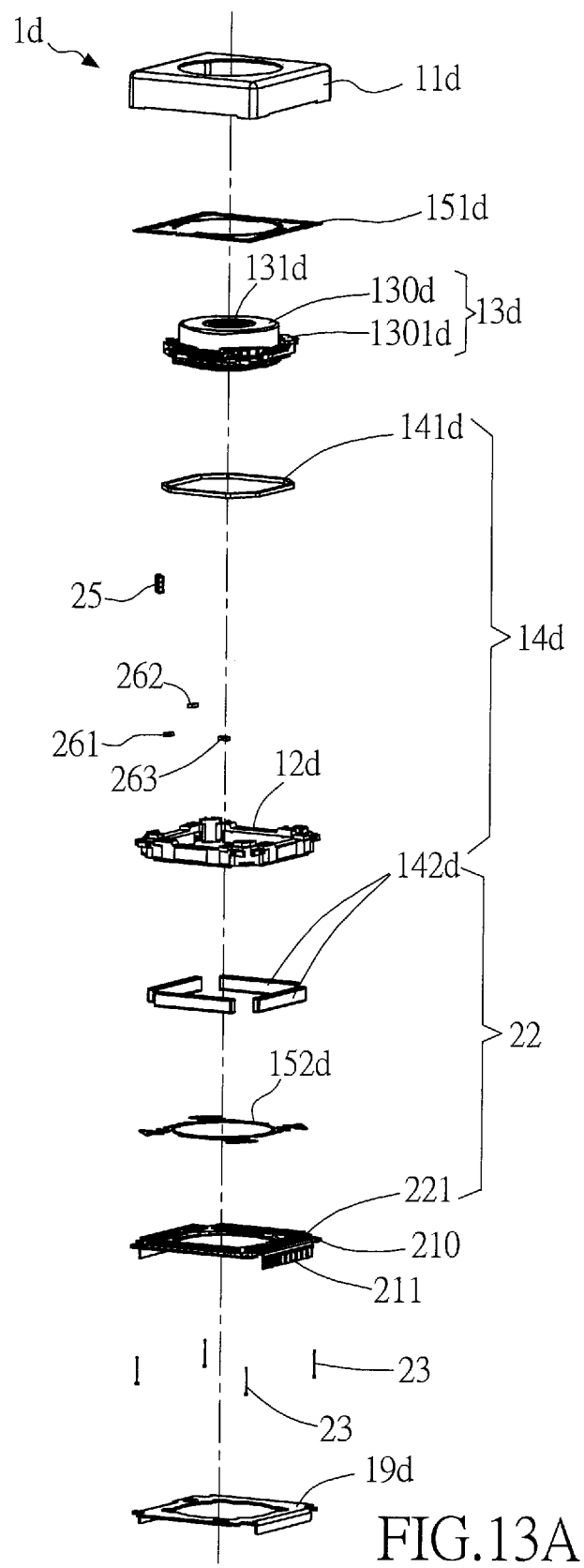
FIG. 13A and FIG. 13B are respectively a perspective exploded view and a perspective assembled view of the eighth embodiment of the lens module of the present invention.
Figure 13B:
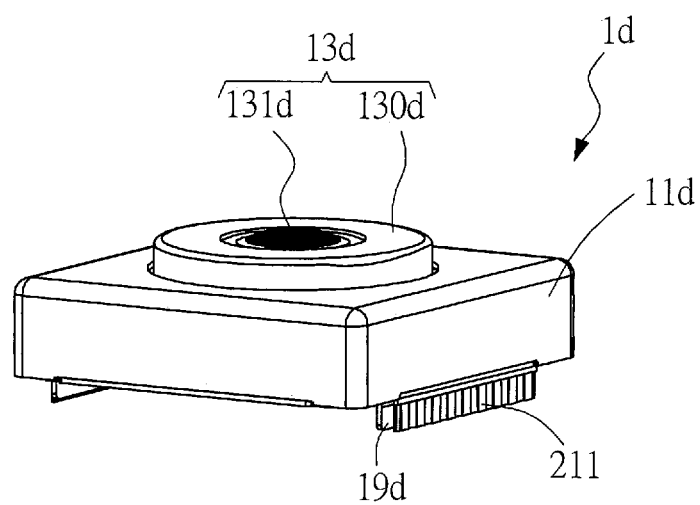

Please refer to FIG. 13A and FIG. 13B, which are respectively a perspective exploded view and a perspective assembled view of the eighth embodiment of the lens module of the present invention. In this eighth embodiment, the lens module 1d provides both the AF and the OIS functions, which comprises: a case 11d, a frame 12d, a lens unit 13d, a first driving module 14d, at least one spring 151d, 152d, a circuit board 210, a second driving module 22, a plurality of suspension wires 23, a bottom plate 19d, at least one sensing magnet 25 and a plurality of position sensors 261, 262, 263.

The case 11d is a hollow lid-like structure, which has an opening at middle of the top surface for light to pass through. The area inside the case 11d is empty. The frame 12d is located inside the case 11d, but does not directly contact nor directly fix to the case 11d. The frame 12d has an inner compartment and a plurality of positioning slots. The lens unit 13d is received within the inner compartment of the frame 12d in such a manner that, the lens unit 13d is movable relative to the frame 12d along an optical axis in a limited distance. The lens unit 13d is mounted with at least one lens which defines the optical axis for the external image light to pass through the lens unit 13d. The first driving module 14d is furnished between the frame 12d and the lens unit 13d for driving the lens unit 13d to move relative to the frame 12 (or case 11d or bottom plate 19d) along the optical axis 9 in order to provide the AF function. In this embodiment, the first driving module 14d comprises at least one coil 141d and a plurality of driving magnets 142d. The coil 141d is located at a rim portion 1301d of the lens unit 13d, while the driving magnets 142d are located at the positioning slots of the frame 142d and are corresponding to the coil 141d. By applying electric currents to the coil 141d, the lens unit 13d can be driven to move along the optical axis relative to the frame 12d; in addition, the case 11d and the frame 12d provide a stopping function respectively at the top end and the bottom end of the lens unit 13d for restricting a movable range of the lens unit 13d. The springs 151d, 152d are connected between the frame 12d and the lens unit 13d and are located respectively at the top end and the bottom end of the lens unit 13d. The outer rims of the springs 151d, 152d are fixed on the frame 12d, while the inner portions of the springs 151d, 152d are fixed on the lens unit 13d, so as to elastically support the lens unit 13d inside the frame 12d, and also to constraint the lens unit 13d to move a limited distance along the optical axis relative to the frame 12d. In addition, when the current supplied to the coil 141d is stopped, the lens unit 13d will be pulled back to an initial position due to the elastic forces of the springs 151d, 152d. The circuit board 210 is located under the frame 12d but does not directly contact to both the frame 12d and the lens unit 13d. The second driving module 22 is furnished between the frame 12d and the circuit board 210 for driving the frame 12d together with the lens unit 13d to move horizontally relative to the circuit board 210 and the case 11d in order to provide the OIS function. In addition, when the second driving module 22 drives the frame 12d and the lens unit 13d to move horizontally, the case 11d provides a stopping function for restricting a movable range of the frame 12d. In this embodiment, the second driving module 22 includes a plurality of horizontal circuits 221 furnished on the circuit board 210 and those driving magnets 142d mounted on the frame 12d. That is, in this embodiment, the driving magnets 142d are shared by the first and second driving modules 14d, 22. However, in another embodiment not shown in figures, the first and second driving modules 14d, 22 can have their own magnets; which means, the second driving module 22 will have its own horizontal magnets furnished on the frame at locations near and corresponding to those horizontal coils. The suspension wires 23 are extending between the frame 12d and the circuit board 210 for suspending the frame 12d above the circuit board 210 in such a manner that, the frame 12d is movable relative to the circuit board 210 in a limited distance horizontally. The bottom plate 19d is located below the circuit board 210 and is fixed to the case 11d and the circuit board 210. In this embodiment, a connecting board 211 extending downward from a side of the circuit board 210 is electrically connected to the external circuit. In this embodiment, the upper end of each suspension wire 23 is fixed to a corner of the frame 12d, while the bottom end of each suspension wire 23 is passing through the circuit board 210 and then fixed to a corner of the bottom plate 19d. Among these position sensors 261, 262, 263 (for example, Hall sensors), two of the position sensors 262, 263 are located on the circuit board 210 and are respectively corresponding to one of the driving magnets 142d; while the other one position sensor 261 is mounted on either the frame 12d or the circuit board 210 and is corresponding to the sensing magnet 25. Using these position sensors 261, 262, 263 to detect the variations of magnetic fields of their corresponding magnets 25, 142d, variations of displacements of the lens unit 13d along the optical axis and horizontal directions can be calculated, so as to feed-back control the operations of the first driving module 14d and the second driving module 22 in order to achieve the function of tri-axial closed-loop control. The case 11d is sleeved and fixed to the bottom plate 19d, so as to accommodate the aforementioned components between the case 11d and the bottom plate 19d to form an integrated lens module 1d.

Figure 14:
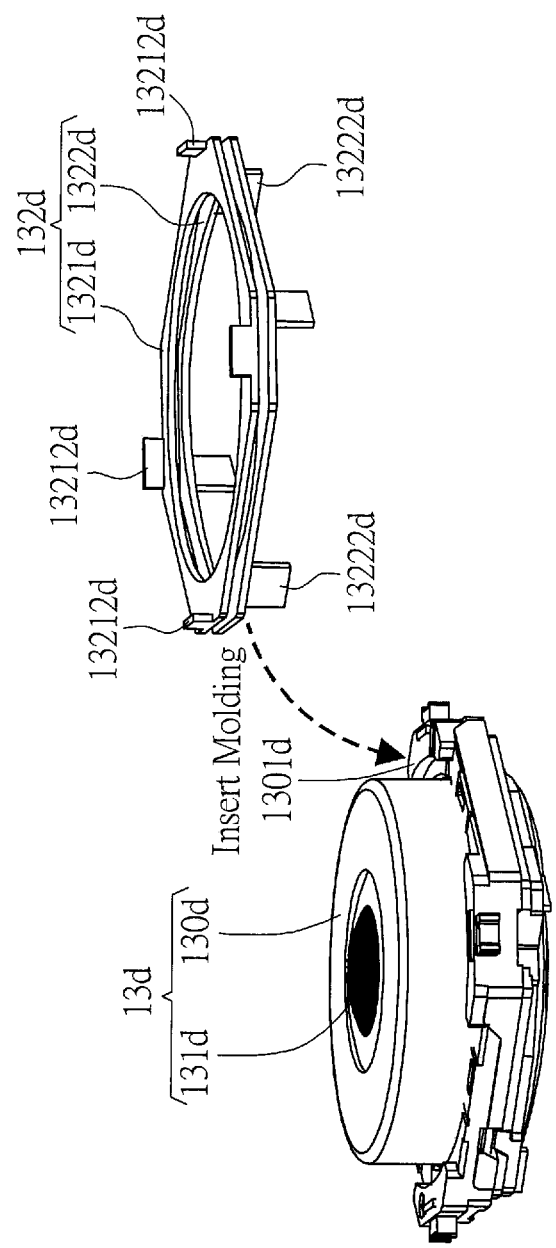
FIG. 14 is a perspective exploded view of the eighth embodiment of the lens unit of the lens module of the present invention.

Please refer to FIG. 14, FIG. 15A and FIG. 15B, which are respectively a perspective exploded view, a perspective assembled view (first perspective angle), and another perspective assembled view (second perspective angle) of the eighth embodiment of the lens unit of the lens module of the present invention. In this eighth embodiment, most of the structure of the lens unit 13d is the same as that of the lens unit in the third embodiment shown in FIG. 6, and the only difference is that the structures of the embedded members 132d of these two embodiments are different.

In the eighth embodiment shown in FIG. 14, the embedded member 132d is also embedded in the rim portion 1301d of the body 130d of the lens unit 13d be means of plastic insert-molding. The embedded member 132d comprises: two independent plate-like structures 1321d, 1322d conforming to the shape of the rim portion 1301d, and a plurality of additional protrusions 13212d, 13222d protruding upward or downward from a side of the two independent plate-like structures 1321d, 1322d. These two plate-like structures 1321d, 1322d are independent and separated from each other without any connecting portion connected therebetween. When the embedded member 132d is insert-molded into the rim portion 1301d of the body 130d, the additional protrusions 13212d, 13222d protruding upward or downward are exposed outside an upper surface or a lower surface of the rim portion 1301d of the body 130d. In addition to that the metal embedded member 132*d* itself can improve the structural strength of the rim portion 1301*d*, and the additional protrusions 13212*d*, 13222*d* protruding upward or downward from the rim portion 1301*d* can also be used as the impact points of the lens unit 13*d* when it moves along the optical axis, or when the lens unit 13*d* contacts or impacts the springs 151*d*, 152*d*, the case 11*d*, or the bottom plate 19*d*. Furthermore, in another embodiment of the invention, two ends of the coil 141*d* can be electrically connected to one of the additional protrusions 13212*d*, 13222*d*, such that, not only the two independent plate-like structures 1321*d*, 1322*d* of the embedded member 132*d* can become conductive passages for the driving currents required by the coil 141*d* to transmit there-through, but also the ends of the coil 141*d* can be welded to an adjacent protrusion to facilitate the wire-bonding process. That is, the two independent plate-like structures 1321*d*, 1322*d* of the embedded member 132*d* can be used to transmit electricity required by the coil 141*d*.

Figure 16:
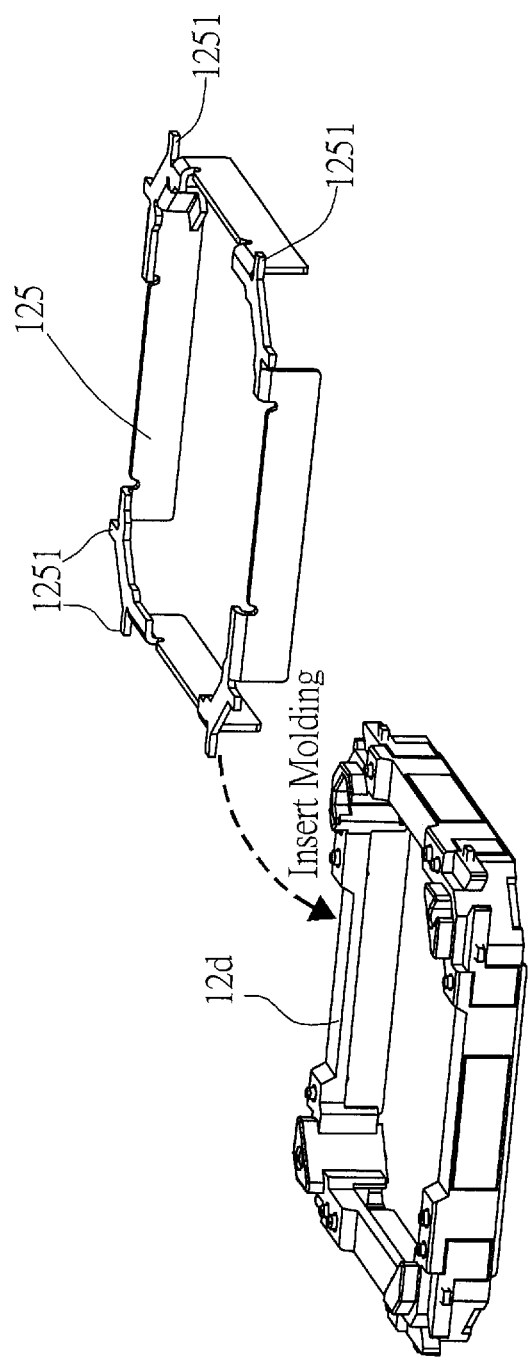
FIG. 16 is a perspective exploded view of the frame in the eighth embodiment of the lens module of the present invention as shown in FIG. 13A.
Figure 17:
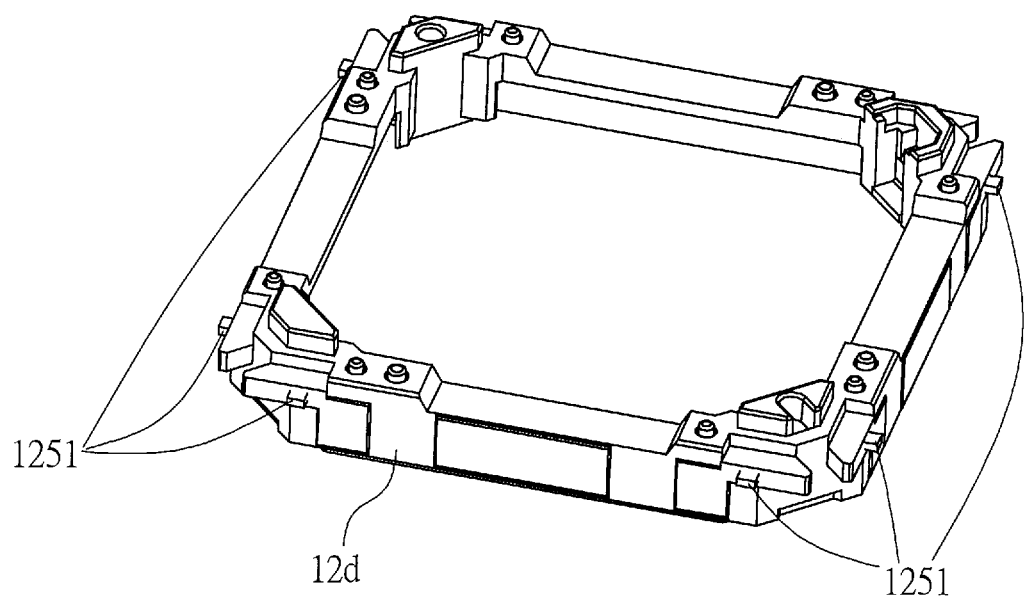
FIG. 17 is a perspective assembled view of the frame in the eighth embodiment of the lens module of the present invention as shown in FIG. 13A.

Please refer to FIG. 16 and FIG. 17, which are respectively the perspective exploded view and the perspective assembled view of the frame in the eighth embodiment of the lens module of the present invention as shown in FIG. 13A. In this eighth embodiment, the frame 12*d* further includes: a frame body made of plastic and a frame embedded member 125 made of metal, wherein, the frame embedded member 125 is embedded in the frame body by a plastic insert-molding process or other means to form the integrated frame 12*d*. In addition, the frame embedded member 125 further includes a plurality of frame protrusions 1251 which are exposed outside of the frame body. When the frame 12*d* moves relative to the case 11*d* horizontally, the frame 12*d* may contact the case 11*d*, and, the location where the frame 12*d* contacts the case 11*d* is one of the frame protrusions 1251. Therefore, the metal frame embedded member 125 not only can improve the structural strength of the frame 12*d*, but also can allow the metal frame protrusions 1251 to protrude outside of the frame 12*d* to become the impact points in the lateral directions, so as to improve the structural strength, impact resistance and wear resistance of the frame 12*d*.

While the present invention has been particularly shown and described with reference to a preferred embodiment, it will be understood by those skilled in the art that various changes in form and detail may be without departing from the spirit and scope of the present invention.

What is claimed is:

1. A lens module, comprising:
  a lens unit, said lens unit comprising:
    a body, made of a first material, said body having a rim portion and a central through hole;
    at least one lens, located in the central through hole of the body; an optical axis being defined by said at least one lens for allowing an external light to pass through the lens unit along the optical axis; and
    at least one embedded member, made of a second material; a hardness of the second material is greater than another hardness of the first material; wherein, at least a part of the embedded member is embedded within the rim portion of the body;
  a frame, the lens unit being received in the frame and being movable relative to the frame in a limited distance; and
  a first driving module, furnished between the frame and the lens unit for driving the lens unit to move relative to the frame;
  wherein, said at least one embedded member of the lens unit further includes at least one protrusion; said at least one protrusion is exposed outside of the rim portion of the body; when the lens unit moves relative to the frame, the frame provides a stopping function for restricting a movable range of the lens unit; in addition, the position at which the frame is touched on the lens unit is the position of one of said at least one protrusion.

2. The lens module of claim 1, wherein, the first material is plastic, and, the second material is metal.

3. The lens module of claim 2, wherein, the second material is non-magnetic metal, said non-magnetic metal is one of the following: copper, copper alloy, stainless steel, aluminum, aluminum alloy, aluminum-magnesium alloy.

4. The lens module of claim 2, wherein, said at least one embedded member includes a plate-like structure conforming to the shape of the rim portion.

5. The lens module of claim 1, wherein, the first driving module comprises: at least one coil and at least one magnet; said at least one coil is located on the rim portion of the lens unit, two ends of the coil is electrically connected with one of the at least one protrusion such that the embedded member can transmit electric current for the coil; said at least one magnet is located at the frame and is corresponding to said at least one coil.

6. The lens module of claim 5, wherein, the first driving module comprises two said coils which are electrically connected via the at least one embedded member.

7. The lens module of claim 5, wherein, said at least one coil is positioned on the rim portion of the body by means of said at least one protrusion.

8. A lens module, comprising:
  a first component;
  a second component; and
  a driving module, for driving one of the first component and the second component to move relative to the other;
  wherein, the first component comprises an embedded member, a hardness of the embedded member is greater than another hardness of the first component; at least a part of the embedded member is embedded inside the first component; in addition, the embedded member has at least one protrusion which is exposed outside of the first component;
  wherein, when one of the first component and the second component moves relative to the other, the first component is in contact with the second component by the at least one protrusion;
  wherein, the first component is a lens unit, the second component is a case, the driving module is a first driving module;
  wherein, the first driving module drives the lens unit to move relative to the case;
  wherein, the lens unit comprises a body; said body has a rim portion and a central through hole;
  wherein, said central through hole of said body is capable of receiving at least one lens; when said at least one lens is received in the central through hole of said body, an optical axis is defined by said at least one lens for allowing an external light to pass through the lens unit along the optical axis;
  wherein, at least a part of the embedded member is embedded within the lens unit, in addition, said at least one protrusion is exposed outside of the lens unit; moreover, when the lens unit moves relative to the case, the case provides a stopping function for restricting a movable range of the lens unit; furthermore, a location where the lens unit contacts the case is one of the at least one protrusion.

9. The lens module of claim 8, wherein, the first component is made of plastic, and, the embedded member is made of metal.

* * * * *